United States Patent Office 3,647,886
Patented Mar. 7, 1972

3,647,886
HYDROCARBON OXIDATION
Theodore C. Mead, Texaco Inc., P.O. Box 1608, Port Arthur, Tex. 77640; and Harry Chafetz, Texaco Inc., P.O. Box 509, Poughkeepsie, N.Y. 12508
No Drawing. Filed Feb. 8, 1968, Ser. No. 703,913
Int. Cl. C07c 73/08
U.S. Cl. 260—610 B        4 Claims

ABSTRACT OF THE DISCLOSURE

A method of producing a hydrocarbon hydroperoxide selected from the group consisting of

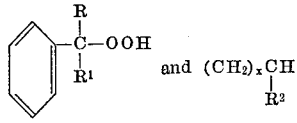
and $(CH_2)_x\underset{R^2}{\underset{|}{CH}}$—OOH where R and $R^1$ are hydrogen or alkyl of from 1 to 10 carbons and at least one of said R and $R^1$ is alkyl, $R^2$ is n-alkyl of from 1 to 10 carbons and $x$ is an integer of from 3 to 10, comprising contacting a hydrocarbon selected from the group consisting of

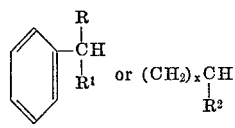
or $(CH_2)_x\underset{R^2}{\underset{|}{CH}}$ where R, $R^1$, $R^2$ and $x$ are as heretofore defined with an oxygen containing gas in the presence of alkali metal fluoride.

BACKGROUND OF INVENTION

The invention is in the field of art relating to hydroperoxides of hydrocarbon materials.

In the past, one of the more frequently employed methods of preparing hydroperoxides were carrying out the hydroperoxidations in alkaline emulsion. Briefly, such prior methods called for oxidation of alkylbenzenes, such as cumene, with air or oxygen in the presence of aqueous alkali, e.g., aqueous sodium hydroxide. A disadvantage of this method is that the extent of conversion to hydroperoxide is limited because of instability of the hydroperoxide. Further, separation of the hydroperoxide product from the aqueous alkali is sometimes complicated by the formation of emulsion in which it is difficult to separate the components thereof.

SUMMARY OF INVENTION

We have discovered and this constitutes our invention a method of preparing hydrocarbyl hydroperoxides in which the makeup of the final reaction mixture is in a non-emulsified state thereby permitting recovery of the hydroperoxide product therefrom via less time consuming and less costly means than in the aforedescribed prior art method. Further, the novel catalyst employed is in the solid state, thereby facilitating its separation from the hydroperoxide product. Still further, our method produces hydroperoxides in generally higher yields than in the aforedescribed prior art method.

More particularly our invention comprises forming a hydrocarbyl hydroperoxide selected from the group consisting of

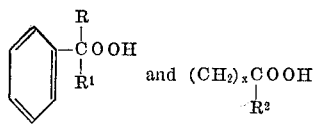
and $(CH_2)_x\underset{R^2}{\underset{|}{C}}OOH$ where R and $R^1$ are hydrogen or alkyl of from 1 to 10 carbons and at least one of said R and $R^1$ groups is alkyl, $R^2$ is n-alkyl of from 1 to 10 carbons, and $x$ is an integer from 3 to 10, comprising contacting a hydrocarbyl hydrocarbon of the formula:

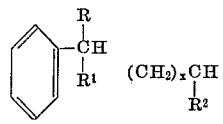
$(CH_2)_x\underset{R^2}{\underset{|}{CH}}$ where R, $R^2$ and $x$ are as heretofore defined with an oxygen containing gas in the presence of KF.

DETAILED DESCRIPTION OF THE INVENTION

Specifically, the method of the invention comprises contacting a hydrocarbon selected from the group consisting of

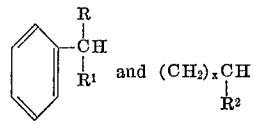
and $(CH_2)_x\underset{R^2}{\underset{|}{CH}}$ where R, $R^1$, $R^2$ and $x$ are as heretofore defined with an oxygen containing gas in the presence of KF, at a temperature between about 100 and 350° F. under a pressure between about 7 and 1000 p.s.i. utilizing a mole ratio of oxygen to hydrocarbon reactant of at least about 1:10, preferably between about 1:5 and 2:1, and an alkali metal fluoride content based on the hydrocarbon reactant of between about 0.1 and 10 wt. percent to form a hydrocarbyl hydroperoxide of the formula:

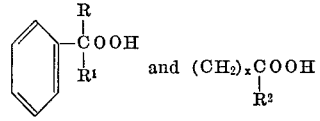
and $(CH_2)_x\underset{R^2}{\underset{|}{C}}OOH$ where R, $R^1$, $R^2$ and $x$ are as heretofore defined.

Under preferred conditions the hydrocarbon reactant and alkali metal fluoride catalyst are maintained in an agitated state, e.g., via stirring or passing the oxygen containing gas therethrough or a combination thereof. Further, under preferred conditions the reaction is conducted utilizing a temperature between 160 and 250° F., a catalyst content between about 1 and 5 wt. percent and a pressure of between 7 and 500 p.s.i.

The hydroperoxide is recovered from the final reaction mass by standard means such as filtration to remove the solid catalyst followed by selective extraction or distillation to remove the hypdroperoxide product from the filtrate.

In the method of the invention it is theorized that the alkali metal halide as defined functions in the reaction by complexing during the reaction with the formed hydroperoxide to prevent decomposition of the hydroperoxide.

Examples of the hydrocarbon reactant contemplated herein are cumene, ethylbenzene, sec.-butylbenzene, sec-pentylbenzene, 10-phenyleicosane, methylcyclopentane, pentylcyclopentane and methylcyclohexane.

Examples of the hydroperoxide product are cumene, hydroperoxide, ethylbenzene hydroperoxide, sec-butylbenzene hydroperoxide, sec-pentylbenzene hydroperoxide and 10-phenyleicosane hydroperoxide wherein the hydroperoxide group is attached to the aliphatic carbon adjacent to the aromatic ring. Additional examples are 1-methylcyclopentane hydroperoxide, 1-pentylcyclopentane hydroperoxide, and 1-methylcyclohexane hydroperoxide.

Examples of the oxygen containing gas contemplated herein are pure oxygen, air, oxygen diluted with inert gases such as nitrogen. Further, the pressure in the reaction system is normally supplied by the oxygen containing gas.

The solid alkali metal fluoride catalyst employed in order to facilitate exposure to the reactants is advantageously of a particle size diameter of between about 0.04 and 1.5 mm.

The hydroperoxides are useful as intermediates in the preparation of keto and hydroxy compounds such as in the decomposition of cumyl hydroperoxide into phenol and acetone.

The following examples further illustrate the invention but are not to be considered as limitations thereof.

Example I

To a glass liner inerted in a one-gallon stainless steel autoclave fitted with a magnetic stirrer, there was charged 1.2 kilograms cumene and 25 grams potassium fluoride of an average diameter of about 0.5 mm. The reactor was then pressured and maintained with oxygen to an oxygen pressure of 380 p.s.i. The stirrer was actuated and the autoclave was heated to and maintained at 256° F. for a period of 8 hours. At the end of the reaction period the cumene hydroperoxide was analyzed by titration with KI according to the method of Wagner, Smith and Peters, Anal. Chem. 19, 979 (1947) and by gas chromatography. Utilizing the foregoing method two runs were made. Run A is representative of the method of the invention and Run B is comparative in that its duplicates the aforedescribed procedure except no alkali metal fluoride was employed. In Run A the yield of cumene hydroperoxide was 28 wt. percent at the end of 8 hours, whereas in comparative Run B the yield reached a maximum of about 14 wt. percent.

Example II

To a glass liner inserted in a one-gallon stainless steel autoclave fitted with a magnetic stirrer, there was charged 900 grams methylcyclopentane and 25 grams potassium fluoride of an average diameter of about 0.5 mm. The reactor was then pressured and maintained with oxygen to an oxygen pressure of 700 p.s.i. The stirrer was actuated and the autoclave was heated to and maintained at 255° F. for a period of 4 hours. At the end of the reaction period the reaction mixture was analyzed by titration by the method used in Example I. Run A is representative of the method of the invention and Run B is comparative in that it duplicates the aforedescribed procedure except no alkali metal fluoride was employed. In Run A the yield of methylcyclopentane hydroperoxide was 5 wt. percent at the end of 4 hours, whereas in comparative Run B the yield reached a maximum of about 3.7 wt. percent.

We claim:
1. A method of preparing a hydrocarbyl hydroperoxide selected from the group consisting of

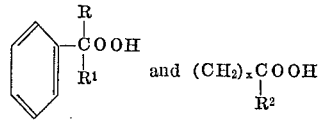

where R and $R^1$ are hydrogen or alkyl of from 1 to 10 carbons and at least one of said R and $R^1$ is alkyl, $R^2$ is n-alkyl of from 1 to 10 carbons, and $x$ is an integer from 3 to 10, comprising contacting a hydrocarbon selected from the group consisting of

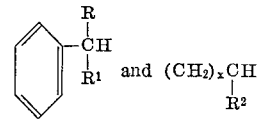

where R, $R^1$, $R^2$ and $x$ are as heretofore defined with an oxygen containing gas in the presence of between about 0.1 and 10 wt. percent based on said hydrocarbon of KF, at a temperature between about 100 and 350° F. under pressure of between about 7 and 1000 p.s.i. utilizing a mole ratio of oxygen to said hydrocarbon of at least about 1:10.

2. A method in accordance with claim 1 wherein said temperature is between about 50 and 250° F., said oxygen to hydrocarbon mole ratio is between about 1:5 and 2:1, said potassium fluoride present in a wt. percent of between about 1 and 5, said potassium fluoride is of a particle average diameter size between about 0.04 and 1.1 mm.

3. A method in accordance with claim 2 wherein said hydrocarbon is cumene and said hydrocarbyl hydroperoxide is cumene hydroperoxide.

4. A method in accordance with claim 2 wherein said hydrocarbon is methylcyclopentane and said hydrocarbon hydroperoxide is 1-methylcyclopentane hydroperoxide.

References Cited
UNITED STATES PATENTS 2,776,999    1/1957    Joris _____ 260—610 B
2,867,666    1/1959    Erickerson _____ 260—610 B BERNARD HELFIN, Primary Examiner W. B. LONE, Assistant Examiner